(12) United States Patent
Sweeney

(10) Patent No.: US 9,293,065 B2
(45) Date of Patent: Mar. 22, 2016

(54) APPARATUS AND METHOD FOR DEMONSTRATING THE BENEFICIAL EFFECTS OF ELASTIC ARTERIES

(75) Inventor: Terrence E. Sweeney, Clarks Summit, PA (US)

(73) Assignee: University of Scranton, Scranton, PA (US)

( * ) Notice: Subject to any disclaimer, the term of this patent is extended or adjusted under 35 U.S.C. 154(b) by 362 days.

(21) Appl. No.: 13/246,758

(22) Filed: Sep. 27, 2011

(65) Prior Publication Data

US 2012/0077170 A1   Mar. 29, 2012

Related U.S. Application Data

(60) Provisional application No. 61/387,263, filed on Sep. 28, 2010.

(51) Int. Cl.
G09B 23/28 (2006.01)
G09B 23/30 (2006.01)

(52) U.S. Cl.
CPC .................................. *G09B 23/303* (2013.01)

(58) Field of Classification Search
USPC .................................. 434/268; 446/220, 224
See application file for complete search history.

(56) References Cited

U.S. PATENT DOCUMENTS 2,509,429 A * 5/1950 Grow .......................... 84/380 B
2,591,691 A * 4/1952 Forrester ...................... 436/132
3,721,039 A * 3/1973 Cook et al. .................... 446/178
5,195,896 A * 3/1993 Sweeney et al. .............. 434/265
2002/0117173 A1* 8/2002 Lynn et al. ............... 128/202.28

OTHER PUBLICATIONS

Steketee, J. "Demonstration model of the human circulation", IOPscience. 1981. Retrieved from the internet May 6, 2013 from <URL:iopscience.iop.org/0143-0807/2/3/004>.*

* cited by examiner

*Primary Examiner* — Sam Yao
*Assistant Examiner* — Peter J Alley
(74) *Attorney, Agent, or Firm* — Stradley Ronon Stevens & Young, LLP

(57) ABSTRACT

An apparatus for demonstrating the beneficial effects of elastic arteries comprising an input port connected to a one-way valve, the input port having an input cross sectional area; an expandable member having an input and an output, the input of the expandable member communicatively coupled with the input port and the one-way valve for allowing fluid to flow into the expandable member, and the expandable member capable of varying in volume based on a pressure exerted at the input port; and an output port communicatively coupled with the expandable member at the output for allowing fluid to flow out of the expandable member, the output port having an output cross sectional area that is smaller then the input port cross sectional area; and a method of demonstrating the beneficial effects of elastic arteries comprising providing an arterial elasticity simulator and analogizing concepts of cardiovascular physiology with the arterial elastic simulator.

18 Claims, 3 Drawing Sheets

APPARATUS AND METHOD FOR DEMONSTRATING THE BENEFICIAL EFFECTS OF ELASTIC ARTERIES

CROSS REFERENCE TO RELATED APPLICATIONS

This application claims priority to U.S. provisional application Ser. No. 61/387,263 filed on Sep. 28, 2010, which is incorporated by reference as if set forth entirely herein.

BACKGROUND OF INVENTION a. Field of Invention

The invention relates generally to devices and methods for demonstrating aspects of cardiovascular physiology. Particularly, the invention relates to a device and method for demonstrating how elastic major arteries, in conjunction with high downstream resistance and an upstream cardiac outflow valve, smooth out the fluctuations in arterial blood flow. Secondly, the invention demonstrates that the work required to drive flow of a particular magnitude is lessened by the presence of elastic major arteries.

b. Background of the Invention and Description of Related Art

The cardiovascular system is basically a pressure driven transport system, moving its constituents macroscopic distances within an organism, coupled to diffusional transport systems that move constituents microscopic distances. The invention focuses on the convective, macroscopic elements of the cardiovascular system. The fluid, blood, is pressurized in the heart and then moves along a pressure gradient to the tissues throughout the body. Blood pressure and blood flow cycle according the cardiac cycle, diastole to systole. Systole is the contraction phase of the cycle in which blood is pressurized and then ejected. Diastole is the relaxation phase in which the ventricle is filled.

The Elastic Properties of Arteries: Arteries are elastic blood vessels that convey blood away from the heart. Arteries are not rigid like metal pipe. Rather, arteries have elastic properties that allow the size (cross sectional area) of the artery to vary based on blood pressure. At a given location, an artery expands to accept the volume of blood ejected from the heart. As the volume of blood passes downstream, the artery returns to a less expanded state as the pressure decreases in the diastolic phase. The elasticity of arteries allows the arteries to effectively store the contractile energy that the ventricle generates during systole and release it during diastole, maintaining arterial pressure within a more narrow, higher range than would occur if the arteries were rigid. Maintenance of a high arterial pressure throughout the cardiac cycle preserves the pressure gradient driving blood flow, causing a more constant flow rate throughout the cycle, even though the heart ejects blood only intermittently. If arteries were inelastic, blood flow would only occur at systole. Elastic arteries accept pulses of blood volume from the heart and normalize the pulses into a continuous flow. Elastic arteries also reduce the workload on the heart during ejection. The stroke volume is the volume of blood ejected by the heart each beat. By expanding to accommodate a large proportion of the stroke volume during systole, the elastic arteries reduce the immediate flow rate through the high resistance downstream vessels. This reduction in flow rate through the high resistance represents a workload reduction for the heart. As arteries stiffen, the work required to generate the same amount of flow increases.

Arterial elasticity is an important concept in the field of cardiovascular physiology. The flexible nature of tissue in elastic arteries remains vital for proper circulation. Cardiovascular disease is the primary cause of death across the globe. One aspect of cardiovascular disease develops when arteries become damaged and lose their elasticity.

No stand-alone apparatus of the simplicity of the invention is known that performs the function of the invention. However, artwork describing the general concept of the elasticity of blood vessels is typical in general physiology textbooks (e.g., *Human Physiology: From cells to systems* by Lauralee Sherwood ($7^{th}$ Edition); Brooks/Cole, 2009) and cardiovascular physiology textbooks (e.g., *An Introduction to Cardiovascular Physiology*, by J. R. Levick (4th Ed.); Oxford University Press, Inc., New York, 2003). Furthermore, more complex and cumbersome models of cardiovascular systems can demonstrate the concept (e.g., J Steketee, Demonstration model of the human circulation. Eur. J. Phys. 2: 150-154, 1981), but not in the simple fashion of the present invention.

An object of the present invention is to provide a simplified device and method for demonstrating the fluid flow physics and the beneficial effects of elastic arteries.

SUMMARY OF INVENTION

The invention includes a device and method for demonstrating the fluid flow physics and the beneficial effects of elastic arteries. One embodiment of the present invention is an apparatus for demonstrating the beneficial effects of elastic arteries comprising:

an input port connected to a one-way valve disposed to allow flow in an input direction, the input port having an input cross sectional area, an expandable member having an input and an output, the input of the expandable member communicatively coupled with, or integral to, the input port and the one-way valve for allowing the fluid to flow into the expandable member, and the expandable member capable of varying in volume based on a pressure exerted at the input port, and an output port communicatively coupled with, or integral to, the expandable member at the output for allowing the fluid to flow out of the expandable member, the output port having an output cross sectional area that is smaller then the input port cross sectional area, wherein, a demonstrator demonstrates the elasticity of major arteries by associating downstream vascular resistance with the output port, associating upstream cardiac outflow with the input port connected to the one-way valve, and associating arterial elasticity with the expandable member.

Associating the lungs and mouth with the blood pumping function of a heart, an operator blows a volume of air into the input port, observes the expandable member expand to contain the volume of air and contract as the volume of air decreases as air escapes via the output port. An individual observes the air escape under the elastic energy of the expandable member, observes that although the operator is not continuously blowing into the input port, the expandable member continues to cause air to exit via the output port under the elastic energy of the elastic member.

A user demonstrates the importance of elastic arteries for insuring continuous cardiac outflow and reducing cardiac workload by constraining the expansion of the expandable member with one hand, yet letting air flow through the expandable member, and blowing a volume of air into the input port and observes the difficulty in blowing the volume of air relative to an unconstrained expandable member.

An embodiment of the invention includes a method of demonstrating the beneficial effects of elastic arteries comprising the steps of providing an arterial elasticity simulator and analogizing concepts of cardiovascular physiology with the arterial elastic simulator.

In a preferred embodiment, the step of providing an arterial elasticity simulator includes providing an apparatus comprising:

an input port connected to a one-way valve disposed to allow flow in an input direction, the input port having an input cross sectional area, an expandable member having an input and an output, the input of the expandable member communicatively coupled with the input port and the one-way valve for allowing the fluid to flow into the expandable member, and the expandable member capable of varying in volume based on a pressure exerted at the input port, and an output port communicatively coupled with the expandable member at the output for allowing the fluid to flow out of the expandable member, the output port having an output cross sectional area that is smaller then the input port cross sectional area.

In an embodiment, the step of analogizing concepts of cardiovascular physiology with the arterial elastic simulator comprises one or more of: illustrating, discussing, or acknowledging the concept of vascular resistance, illustrating, discussing, or acknowledging the concept of cardiac outflow, and illustrating, discussing, or acknowledging the concept of arterial elasticity.

In an embodiment of the present invention, the step of analogizing concepts of cardiovascular physiology with the arterial elastic simulator comprises one or more of: associating downstream vascular resistance with the output port, associating upstream cardiac outflow with the input port connected to the one-way valve, and associating arterial elasticity with the expandable member.

In an embodiment of the present invention, the step of analogizing concepts of cardiovascular physiology with the arterial elastic simulator includes associating the force of the lungs and mouth of the demonstrator and/or the user with the pumping force of a heart.

In an embodiment of the present invention, cardiovascular concepts are taught, learned and/or understood by blowing a volume of air into the input port and observing the expandable member expand to contain the volume of air and contract as the volume of air decreases as air escapes via the output port.

In an embodiment of the present invention, cardiovascular concepts are taught, learned and/or understood by illustrating, discussing, or acknowledging the concept of arteries having elastic energy and the expandable member having elastic energy to absorb and release fluid pressure, and observing the air escape under the elastic energy of the expandable member.

In an embodiment of the present invention, cardiovascular concepts are taught, learned and/or understood by observing or illustrating, discussing or acknowledging that although the instructor/demonstrator, user, and/or operator is not continuously blowing into the input port, the expandable member continues to cause air to exit via the output port under the elastic energy of the elastic member.

In an embodiment of the present invention, the role of elastic arteries in providing continuous/normalized cardiac outflow and reducing cardiac workload is demonstrated by constraining the expansion of the expandable member with one hand, yet letting air flow through the expandable member, and blowing a volume of air into the input port; observing a first force required to blow air into the input port through to the output port with the expansion of the expandable member constrained, blowing a volume of air into the input port without constraining the expansion of the expandable member, observing a second force required to blow air into the input port through to the output port with the expansion of the expandable member unconstrained, observing a difference in force by comparing the first force with the second force, and associating the difference in force with elastic and rigid (less elastic) arteries of a cardiovascular system.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
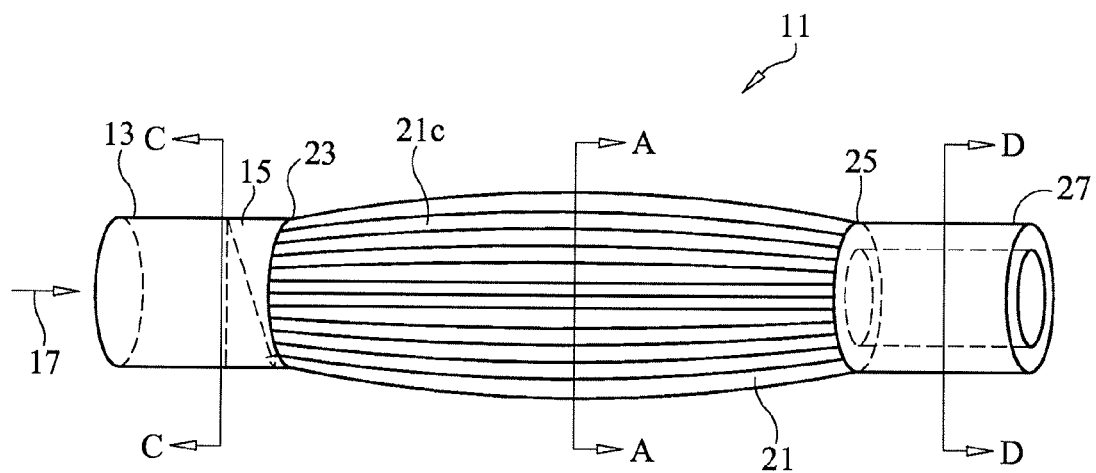
FIG. 1 is a schematic representation of the apparatus according to an embodiment.
Figure 2:
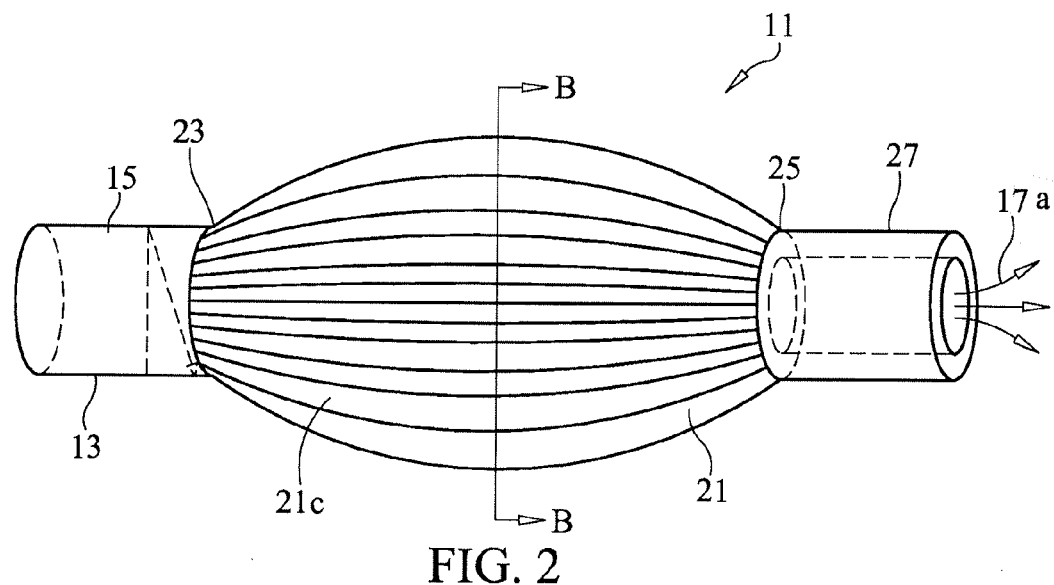
FIG. 2 is a schematic representation of the apparatus showing the expanded expandable member according to an embodiment.
Figure 3:
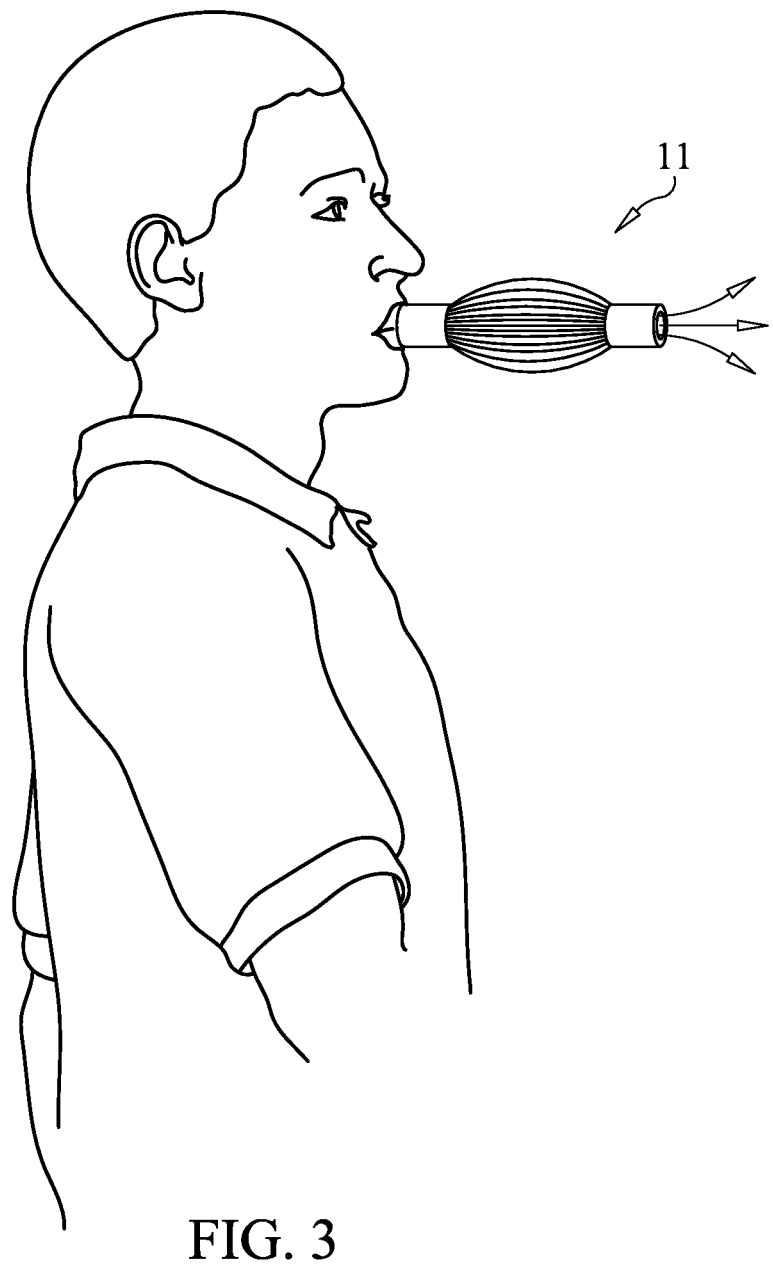
FIG. 3 is a schematic representation of an operator blowing into the apparatus according to an embodiment.
Figure 4:
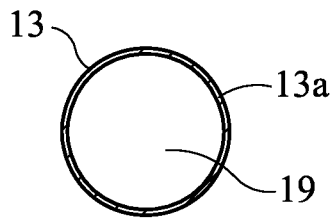
FIG. 4 is a view in cross section of the input port taken at line "C" of FIG. 1.
Figure 5A:
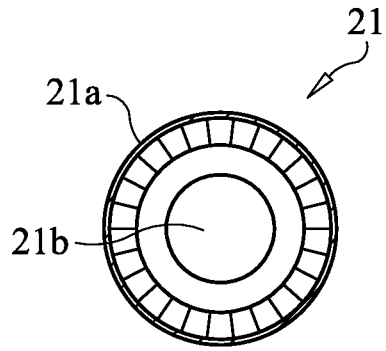
FIG. 5A is a view in cross section of the expandable member taken at line "A" of FIG. 1.
Figure 5B:
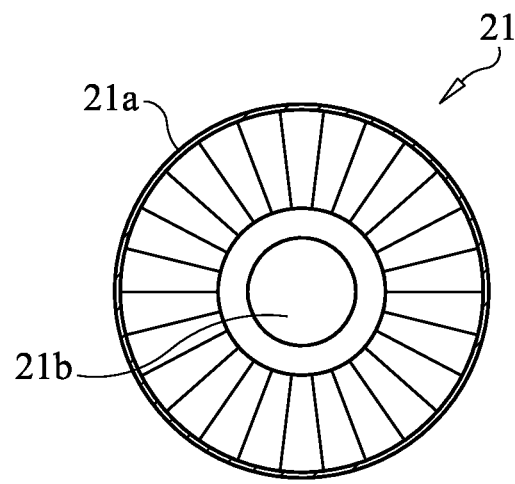
FIG. 5B is a view in cross section of the expandable member taken at line "B" of FIG. 2.
Figure 6:
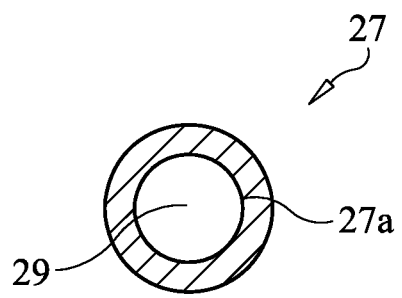
FIG. 6 is a view in cross section of the output port taken at line "D" of FIG. 1.

Referring to the Figures, the invention relates generally to devices and methods used to demonstrate the fluid flow physics and the beneficial effects of elastic arteries. As referred to herein by reference to textbooks in the field of cardiovascular physiology, by example, the beneficial effects of elastic arteries are known and well documented. The present invention is designed as a teaching tool and methodology for teaching and understanding the fluid flow physics and the beneficial effects of elastic arteries as they relate to said beneficial effects.

Each figure shows, in whole or part, an apparatus 11 for demonstrating the beneficial effects of elastic arteries. The apparatus includes an input port 13 connected to a one-way valve 15 disposed to allow flow in an input direction 17, the input port 13 having an input cross sectional area 19. The apparatus further includes an expandable member 21 having an input 23 and an output 25. The input 23 of the expandable member 21 is communicatively coupled with, or integral to, the input port 13 and the one-way valve 15 for allowing the fluid to flow into the expandable member 21. The expandable member 21 is capable of varying in volume based on a pressure exerted at the input port 13. An output port 27 is communicatively coupled with, or integral to, the expandable member 21 at the output 25 for allowing the fluid to flow out of the expandable member 21. The output port 27 has an output cross sectional area 29 that is smaller than the input port cross sectional area.

The input port 13 functions to communicate fluid flow (air) in the input direction 17 from the lungs and mouth of the user/demonstrator/operator—through the one-way valve 15—to the expandable member 21, when said person blows into the input port 13. The input port 13, preferably is a tube, or any inelastic material forming a wall 13a that envelops an input cross sectional area 19 bound by said wall 13a. The input cross sectional area 19 having a defined dimension, allows a determinable amount of fluid flow for a given pressure, according to basic laws of hydraulics. By analogy to cardiovascular physiology, the lungs and mouth of the person are the heart, which pumps blood (air) through a heart valve (semilunar), into the arteries. The arteries modeled by the expandable member 21. The heart valve is modeled by the one-way valve 15. Thus, the one-way valve 15 acts to constrain fluid flow in the input direction 17, into the expandable member 21, and through the output port 27, and not in a reverse direction.

The expandable member 21 is defined by a flexible or deformable wall 21a that envelops an expandable member cross sectional area 21b creating a variable internal volume 21c bound by the flexible or deformable wall 21a and the input 23 and the output 25. In a preferred embodiment, the expandable member 21 is formed from a balloon. However, the expandable member 21 can be formed or fashioned from any commercially available material having elastic/deformable properties, such as an elastomer, such that the wall 21a is expandable/deformable in response to fluid pressure. The expandable member 21 varies in size/cross sectional area/volume to contain the volume of air blown into the input port 13 and contract as the volume of air decreases as air escapes via the output port 27. Thus, the expandable member 21 models a function exhibited by arteries.

The output port 27 acts as an escape or outlet for the air blown into the expandable member 21. The output port 27 is defined by a wall 27a that envelopes an output port cross sectional area 27b through which the air escapes the expandable member 21. The output port cross sectional area 29, being smaller than the input cross sectional area 19, causes air to escape at a slower/lower flow rate than the flow rate air enters the apparatus 11 through the input cross sectional area 19 of the input port 13. This difference in entry/exit flow rates, caused by the smaller cross sectional area of the output port 27, models the physiology of downstream vascular resistance. This disparity in the volume flow of air in and out of the apparatus is absorbed by the expandable member 21, causing the wall 21a to deform or stretch, causing the expandable member cross sectional area 21b to increase. In turn, the internal volume 21c of the expandable member 21 increases to contain the air. The energy of the wall 21, in its stretched/deformed state, being created by the wall material's tendency to return to its original state, causes the air in the expandable member 21 to continue to escape through the output port 27—even though the person has stopped blowing into the apparatus 11.

In a preferred embodiment, the apparatus 11 is constructed with a one-way, low-breaking point valve (a commercially available spirometer valve); a large latex balloon (approximately 12 inches in diameter, if typically inflated); and a 6 ml. disposable syringe barrel. The three parts are held together with air tight seals, by the use of plastic cable ties. To assemble the apparatus 11, a hole of approximately one half inch is cut in to the bottom and that end of the balloon is stretched over the outflow side of the one-way valve, and the two are permanently secured together by a cable tie. The open neck of the balloon, cut to shorten as necessary, is stretched over the wide end of the syringe barrel (after the barrel flange has been cut off), and the balloon and the syringe barrel are permanently secured together by another cable tie.

In operation, a volume of air enters input port 13 in an input direction 17 and passes through the one-way valve 15 into the input 23 of the expandable member 21. The one-way valve 15 prevents flow in a direction other than the input direction 17. The volume of air causes the expandable member 21 to expand because the volume of air cannot exit the apparatus 11 at the same rate as the volume of air enters the apparatus, due to the input cross sectional area 19 being larger than the output cross sectional area 29. When air stops entering the input port 13, the one-way valve 15 closes and prevents the volume of air from escaping via the input 23. When the one-way valve is closed, the energy of the expanded expandable member 21 causes the air in the expandable member 21 to continue to escape through the output port 27 in the output direction 17a.

In use, a demonstrator demonstrates the elasticity of major arteries by associating downstream vascular resistance with the output port 27, associating upstream cardiac outflow with the input port 13 connected to the one-way valve 15, and associating arterial elasticity with the expandable member 21. An individual then blows a volume of air into the input port 13. One or more individuals observe the expandable member 21 expand to contain the volume of air and contract as the volume of air decreases as air escapes via the output port 27. One or more individuals observe the air escape under the elastic energy of the expandable member 21. One or more individuals may also observe, or be taught, that, although the operator is not continuously blowing into the input port 13, the expandable member 21 continues to cause air to exit via the output port 27 under the elastic energy of the expandable member 21.

An individual demonstrates the importance of elastic arteries for insuring continuous cardiac outflow and reducing cardiac workload by constraining the expansion of the expandable member 21 with one hand, yet letting air flow through the expandable member 21, and blowing a volume of air into the input port 13 and observing the difficulty in blowing the volume of air relative to an unconstrained expandable member 21.

The invention further includes a method of demonstrating the beneficial effects of elastic arteries. An arterial elasticity simulator as described herein, or otherwise within the breadth of this disclosure, is provided and various known concepts of cardiovascular physiology are analogized with the arterial elastic simulator, or its parts.

The step of analogizing concepts of cardiovascular physiology with the arterial elastic simulator may include illustrating, discussing, or acknowledging the concept of vascular resistance and associating downstream vascular resistance with the output port 27.

The step of analogizing concepts of cardiovascular physiology with the arterial elastic simulator may include illustrating, discussing, or acknowledging the concept of cardiac outflow, and associating upstream cardiac outflow with the input port 13 connected to the one-way valve 15.

The step of analogizing concepts of cardiovascular physiology with the arterial elastic simulator may include illustrating, discussing, or acknowledging the concept of arterial elasticity of a cardiovascular system and associating arterial elasticity with the expandable member 21.

The invention further includes a method of teaching and understanding the physiological concepts discussed herein.

An operator uses the arterial elastic simulator by blowing a volume of air into the input port 13. The operator, and/or others, then observes the expandable member 21 expand to contain the volume of air and contract as the volume of air decreases as air escapes via the output port 27.

An embodiment of the method further includes illustrating, discussing, or acknowledging the concept of arteries having elastic energy and the expandable member 21, by analogy, having elastic energy to absorb and release fluid pressure. The arterial elastic simulator is used to observe the air escape through the output 25 under the elastic energy of the expandable member 21.

In an embodiment of the method, an individual observes or illustrates with the tool, discusses or acknowledges that, although the operator is not continuously blowing into the input port 13, the expandable member 21 continues to cause air to exit via the output port 27 under the elastic energy of the expandable member 21. An instructor may associate this step with the concept of normalizing the pulse flow of a heart into a continuous (less discontinuous/less peak and trough) flow pattern.

A further embodiment of the inventive method includes demonstrating the role of elastic arteries in providing continuous cardiac outflow and reducing cardiac workload by a user constraining the expansion of the expandable member 21 with one hand, yet letting air flow through the expandable member 21, and blowing a volume of air into the input port 13. The user observes a first force required to blow air into the input port 13 through to the output port 27 with the expansion of the expandable member 21 constrained. The user blows a volume of air into the input port 13 without constraining the expansion of the expandable member 21. The user observes a second force required to blow air into the input port 13 through to the output port 27 with the expansion of the expandable member 21 unconstrained. The user observes a difference in force by comparing the first force with the second force, and associates, or is taught the association by another of, the difference in force with elastic and rigid arteries of a cardiovascular system. The order of steps in observing the first/second force is not limited as described, but can be reversed, so long as the comparison between the forces is made.

As part of a written or oral lab lecture, the apparatus 11 provides a tool for teaching how the elasticity of arteries allows blood to keep flowing continuously when the heart can only pump in pulses or contractions. Demonstration and/or use of the apparatus 11, may be accompanied with a discussion, written or otherwise, of how the elastic elements of arteries are stretched via pressures exerted during heart contraction of blood. When this blood flow pressure is released upon diastole, the artery returns to its original size. This elastic return causes less discontinuous flow of blood between heart contractions where without it there would only be discontinuous distribution of blood flow.

Demonstration and/or use of the apparatus 11, may be accompanied with a discussion, written or otherwise, of why it is important that blood vessels exhibit both elastic and inelastic properties. Demonstration and/or use of the apparatus 11, may be accompanied with a discussion, written or otherwise, of how the design of the arteries helps to convert a discontinuous pulse of blood coming directly from the heart into a more continuous (less discontinuous) flow in the bloodstream.

Demonstration and/or use of the apparatus 11, may be accompanied with a discussion, written or otherwise, of how a blood vessel is able to change its response to different blood pressures.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

The invention claimed is:

1. An arterial elasticity simulator for demonstrating to a user having a mouth, lungs, and hands concepts of cardiovascular physiology including blood, the heart, a heart valve, and arteries, and focusing on the beneficial effects of elastic arteries, the simulator consisting essentially of:
   an input port adapted to be placed in the mouth of the user who can blow air from the user's lungs into the input port in a linear input direction, the input port having an input cross-sectional area;
   a tubular-shaped expandable member having an input communicatively coupled or integral with the input port for receiving air from the input port, an output, and a flexible wall disposed between the input and the output, defining an expandable cross-sectional area, and transferring air in the linear input direction from the input to the output;
   an output port communicatively coupled or integral with the output of the expandable member for allowing air to flow out of the expandable member in an output direction, the output port having an output cross sectional area that is smaller than the input cross-sectional area of the input port so that air leaves the output port at a slower flow rate than air enters the input port; and
   a one-way valve disposed between the input port and the input of the expandable member and constraining air to flow in the linear input direction into the expandable member and through the output port, and not in a reverse direction,
   wherein the input port, the expandable member, and the output port are all disposed linearly along a common center line, the lungs and mouth of the user simulate the heart, the one-way valve simulates the heart valve, the air simulates the blood, and the expandable member simulates the arteries of the cardiovascular physiology.

2. The arterial elasticity simulator of claim 1 wherein the input port has an outer diameter and the flexible wall has an unexpanded outer diameter approximately equal to the outer diameter of the input port.

3. The arterial elasticity simulator of claim 1 wherein the input port is a tube.

4. The arterial elasticity simulator of claim 1 wherein the input port is an inelastic material forming a wall that envelops the input cross-sectional area bound by the wall.

5. The arterial elasticity simulator of claim 1 wherein the expandable member is formed from an elastomer.

6. The arterial elasticity simulator of claim 1 wherein the expandable member is formed from a balloon.

7. The arterial elasticity simulator of claim 1 wherein the one-way valve is a spirometer valve.

8. The arterial elasticity simulator of claim 1 wherein the difference between the flow rate of air into the input port and the flow rate of air out of the output port simulates the physiology of downstream vascular resistance.

9. The arterial elasticity simulator of claim 1 wherein the output port simulates the physiology of downstream vascular resistance and the input port and one-way valve simulate cardiac outflow.

10. The arterial elasticity simulator of claim 1 wherein the expansion of the expandable member is adapted to be constrained by the hand of the user demonstrating the importance of elastic arteries for insuring continuous cardiac outflow and reducing cardiac workload.

11. An arterial elasticity simulator for demonstrating to a user having a mouth, lungs, and hands concepts of cardiovascular physiology including blood, the heart, a heart valve, and arteries, and focusing on the beneficial effects of elastic arteries, the simulator comprising:
   an input port adapted to be placed in the mouth of the user who can blow air from the user's lungs into the input port in a linear input direction, the input port having an input cross-sectional area;
   a tubular-shaped expandable member comprising a balloon having a diameter of approximately 12 inches, the expandable member having an input communicatively coupled or integral with the input port for receiving air from the input port, an output, and a flexible wall disposed between the input and the output, defining an expandable cross-sectional area, and transferring air in the linear input direction from the input to the output;
   an output port communicatively coupled or integral with the output of the expandable member for allowing air to flow out of the expandable member in an output direction, the output port having an output cross sectional area that is smaller than the input cross-sectional area of the input port so that air leaves the output port at a slower flow rate than air enters the input port; and
   a one-way valve disposed between the input port and the input of the expandable member and constraining air to flow in the linear input direction into the expandable member and through the output port, and not in a reverse direction,
   wherein the input port, the expandable member, and the output port are all disposed linearly along a common center line, the lungs and mouth of the user simulate the heart, the one-way valve simulates the heart valve, the air simulates the blood, and the expandable member simulates the arteries of the cardiovascular physiology.

12. The arterial elasticity simulator of claim 11 wherein the input port has an outer diameter and the flexible wall has an unexpanded outer diameter approximately equal to the outer diameter of the input port.

13. The arterial elasticity simulator of claim 11 wherein the input port is a tube.

14. The arterial elasticity simulator of claim 11 wherein the input port is an inelastic material forming a wall that envelops the input cross-sectional area bound by the wall.

15. The arterial elasticity simulator of claim 11 wherein the one-way valve is a spirometer valve.

16. The arterial elasticity simulator of claim 11 wherein the difference between the flow rate of air into the input port and the flow rate of air out of the output port simulates the physiology of downstream vascular resistance.

17. The arterial elasticity simulator of claim 11 wherein the output port simulates the physiology of downstream vascular resistance and the input port and one-way valve simulate cardiac outflow.

18. The arterial elasticity simulator of claim 11 wherein the expansion of the expandable member is adapted to be constrained by the hand of the user demonstrating the importance of elastic arteries for insuring continuous cardiac outflow and reducing cardiac workload.

* * * * *